(12) United States Patent
McKeen et al.

(10) Patent No.: US 8,458,464 B2
(45) Date of Patent: Jun. 4, 2013

(54) MECHANISM TO HANDLE EVENTS IN A MACHINE WITH ISOLATED EXECUTION

(75) Inventors: Francis X. McKeen, Portland, OR (US); Lawrence O. Smith, Beaverton, OR (US); Benjamin Crawford Chaffin, Hillsboro, OR (US); Michael P. Cornaby, Hillsboro, OR (US); Bryant Bigbee, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 20 days.

(21) Appl. No.: 12/869,639

(22) Filed: Aug. 26, 2010

(65) Prior Publication Data

US 2010/0325354 A1 Dec. 23, 2010

Related U.S. Application Data

(62) Division of application No. 09/672,368, filed on Sep. 28, 2000, now Pat. No. 7,793,111.

(51) Int. Cl.
*G06F 21/00* (2006.01)

(52) U.S. Cl.
USPC ............................ 713/164; 713/189; 711/163

(58) Field of Classification Search
None
See application file for complete search history.

(56) References Cited

U.S. PATENT DOCUMENTS 5,835,963 A * 11/1998 Yoshioka et al. ............. 711/207
6,339,816 B1 1/2002 Bausch
6,745,306 B1 * 6/2004 Willman et al. .............. 711/163

FOREIGN PATENT DOCUMENTS

| EP | 0473913 | 3/1992 |
|---|---|---|
| EP | 0930567 | 7/1999 |
| EP | 0961193 | 12/1999 |
| EP | 0965902 | 12/1999 |
| EP | 1030237 | 8/2000 |
| EP | 1085396 | 3/2001 |
| EP | 1146715 | 10/2001 |
| EP | 1271277 | 1/2003 |
| GB | 2256513 A | 12/1992 |
| JP | 2000076139 | 3/2000 |
| WO | WO-9524696 | 9/1995 |
| WO | WO-9729567 | 8/1997 |
| WO | WO-9834365 | 8/1998 |
| WO | WO-9844402 | 10/1998 |
| WO | WO-9905600 | 2/1999 |
| WO | WO-9918511 | 4/1999 |
| WO | WO-9957863 | 11/1999 |
| WO | WO-9965579 | 12/1999 |
| WO | WO-0021238 | 4/2000 |
| WO | WO-0062232 | 10/2000 |
| WO | WO-0127723 | 4/2001 |
| WO | WO-0127821 | 4/2001 |
| WO | WO-0163994 | 8/2001 |
| WO | WO-0175565 | 10/2001 |
| WO | WO-0175595 | 10/2001 |
| WO | WO-9909482 | 1/2002 |
| WO | WO-0217555 | 2/2002 |
| WO | WO-0175564 | 10/2002 |
| WO | WO-02086684 | 10/2002 |

* cited by examiner

*Primary Examiner* — Benjamin Lanier
(74) *Attorney, Agent, or Firm* — Blakely, Sokoloff, Taylor & Zafman LLP

(57) ABSTRACT

A platform and method for secure handling of events in an isolated environment. A processor executing in isolated execution "IsoX" mode may leak data when an event occurs as a result of the event being handled in a traditional manner based on the exception vector. By defining a class of events to be handled in IsoX mode, and switching between a normal memory map and an IsoX memory map dynamically in response to receipt of an event of the class, data security may be maintained in the face of such events.

4 Claims, 5 Drawing Sheets

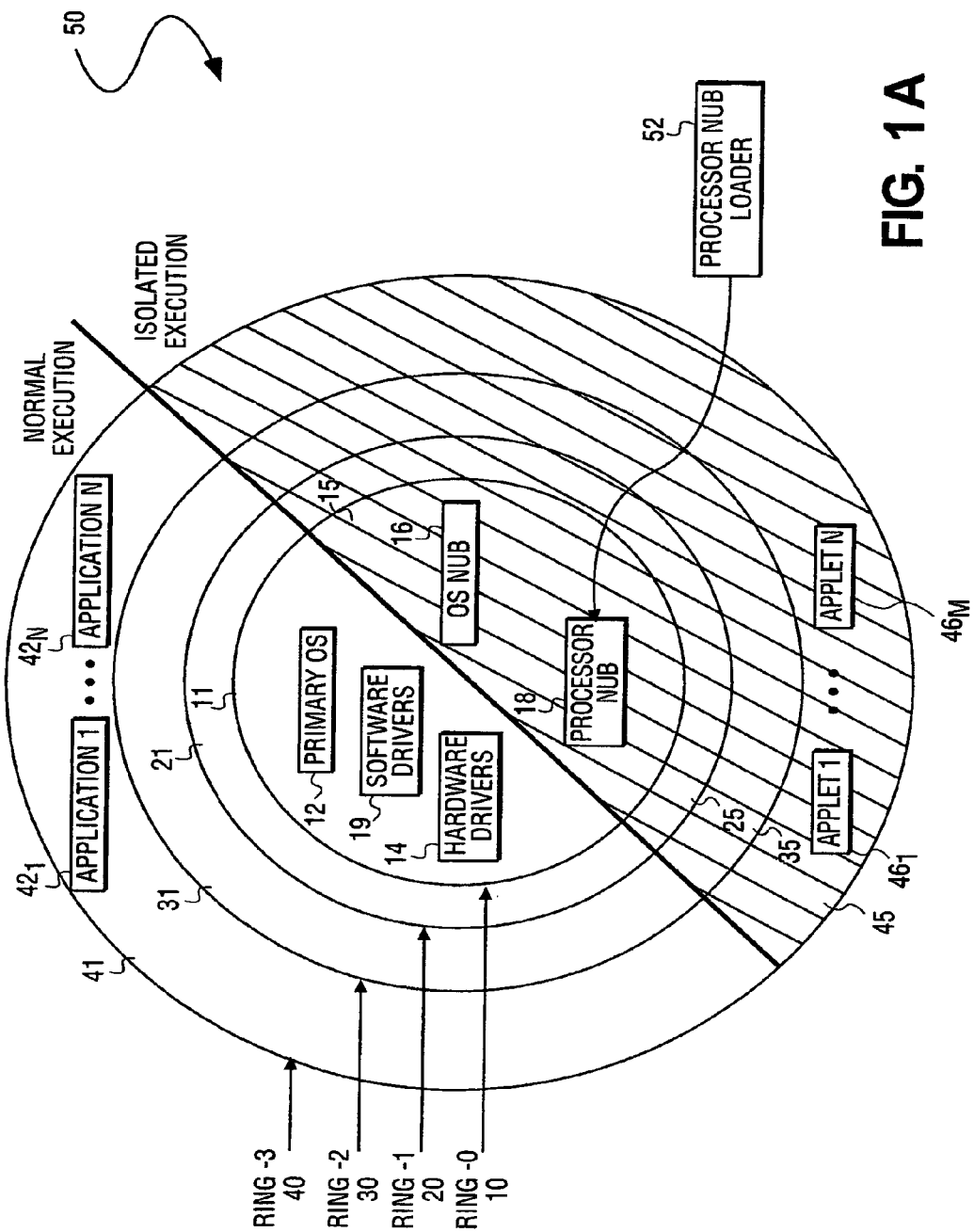

US 8,458,464 B2

MECHANISM TO HANDLE EVENTS IN A MACHINE WITH ISOLATED EXECUTION

CLAIM TO PRIORITY

This application is a divisional application of U.S. Ser. No. 09/672,368, filed Sep. 28, 2000 now U.S. Pat. No. 7,793,111, entitled, "Mechanism To Handle Events In A Machine With Isolated Execution".

BACKGROUND (1) Field of the Invention

The invention relates to platform security. More specifically, the invention relates to handling asynchronous events in a secure manner.

(2) Background

Data security is an ongoing concern in our increasingly data-driven society. To that end, multimode platforms have been developed to support both normal execution and isolated execution. A section of memory is allocated for use only in the isolated execution mode. Encryption and authentication are used any time isolated data is moved into a non-isolated section of memory. In this manner, data used and maintained in isolated execution mode is not security compromised. However, during isolated execution that data may reside, for example, in the processor cache in an unencrypted form. Certain asynchronous events may cause that data to be accessible in a normal execution mode thereby compromising the data security.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 1A is a diagram illustrating an embodiment of the logical operating architecture for the IsoX™ architecture of the platform.

DETAILED DESCRIPTION

Figure 1B:
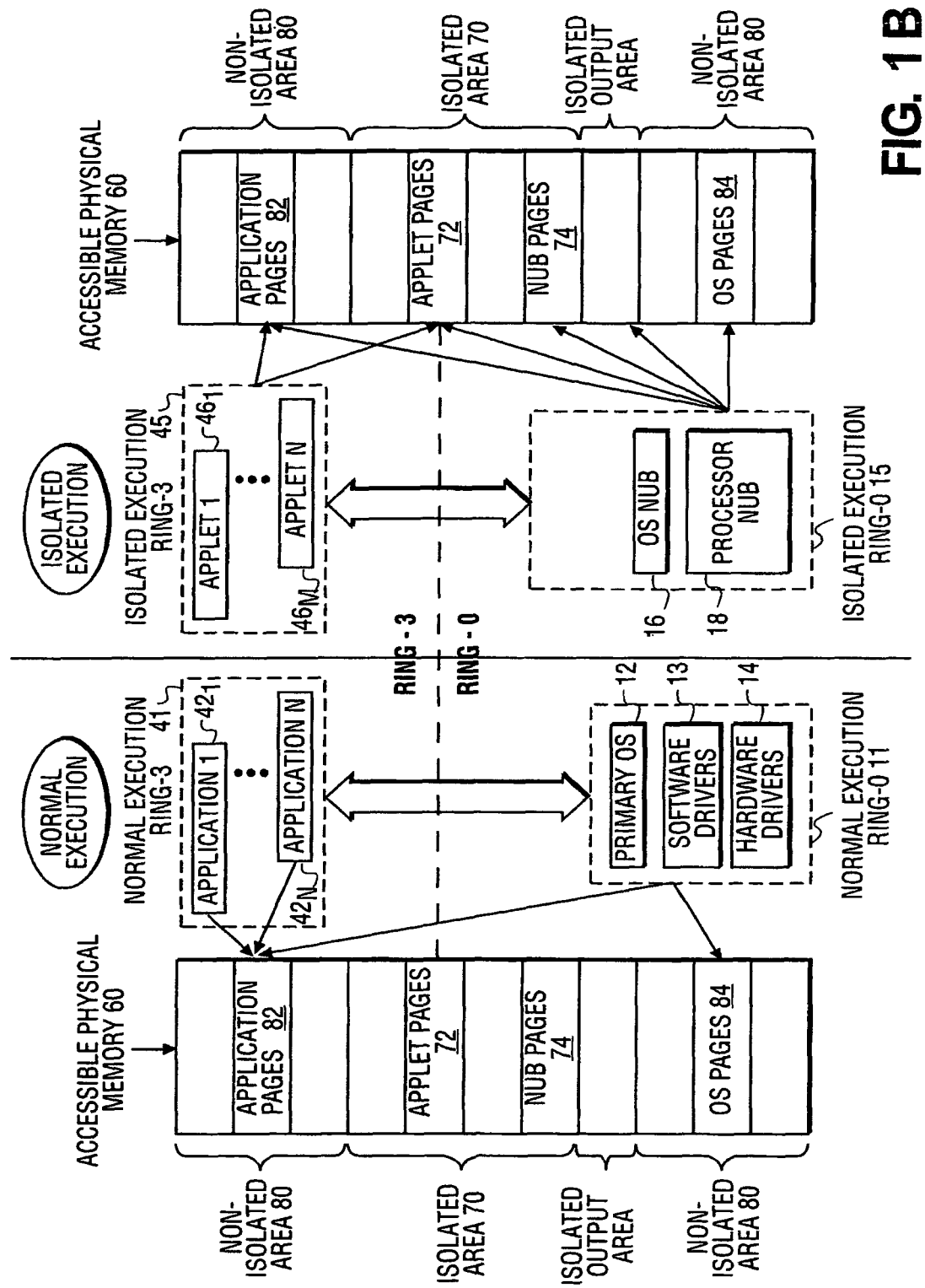
FIG. 1B is an illustrative diagram showing the accessibility of various elements in the operating system and the processor according to one embodiment of the invention.

The present invention relates to a platform and method for secure handling of asynchronous events in an isolated environment. A processor executing in isolated execution "IsoX" mode may leak data when an asynchronous event occurs as a result of the event being handled in a traditional manner based on the exception vector. By defining a class of asynchronous events to be handled in IsoX mode, and switching between a normal memory map and an IsoX memory map dynamically in response to receipt of an asynchronous event of the class, data security may be maintained in the face of such events.

In the following description, certain terminology is used to discuss features of the present invention. For example, a "platform" includes components that perform different functions on stored information. Examples of a platform include, but are not limited or restricted to a computer (e.g., desktop, a laptop, a hand-held, a server, a workstation, etc.), desktop office equipment (e.g., printer, scanner, a facsimile machine, etc.), a wireless telephone handset, a television set-top box, and the like. Examples of a "component" include hardware (e.g., an integrated circuit, etc.) and/or one or more software modules. A "software module" is code that, when executed, performs a certain function. This code may include an operating system, an application, an applet or even a nub being a series of code instructions, possibly a subset of code from an applet. A "link" is broadly defined as one or more information-carrying mediums (e.g., electrical wire, optical fiber, cable, bus, or air in combination with wireless signaling technology) to establish a communication pathway. This pathway is deemed "protected" when it is virtually impossible to modify information routed over the pathway without detection.

In addition, the term "information" is defined as one or more bits of data, address, and/or control and a "segment" is one or more bytes of information. A "message" is a grouping of information, possibly packetized information. "Keying material" includes any information needed for a specific cryptographic algorithm such as a Digital Signature Algorithm. A "one-way function" is a function, mathematical or otherwise, that converts information from a variable-length to a fixed-length (referred to as a "hash value" or "digest"). The term "one-way" indicates that there does not readily exist an inverse function to recover any discernible portion of the original information from the fixed-length hash value. Examples of a hash function include MD5 provided by RSA Data Security of Redwood City, Calif., or Secure Hash Algorithm (SHA-1) as specified in a 1995 publication Secure Hash Standard FIPS 180-1 entitled "Federal Information Processing Standards Publication" (Apr. 17, 1995).

I. Architecture Overview

A platform utilizing an embodiment of the invention may be configured with an isolated execution (IsoX™) architecture. The IsoX™ architecture includes logical and physical definitions of hardware and software components that interact directly or indirectly with an operating system of the platform. Herein, the operating system and a processor of the platform may have several levels of hierarchy, referred to as rings, which correspond to various operational modes. A "ring" is a logical division of hardware and software components that are designed to perform dedicated tasks within the platform. The division is typically based on the degree or level of privilege, namely the ability to make changes to the platform. For example, a ring-0 is the innermost ring, being at the highest level of the hierarchy. Ring-0 encompasses the most critical, privileged components. Ring-3 is the outermost ring, being at the lowest level of the hierarchy. Ring-3 typically encompasses user level applications, which are normally given the lowest level of privilege. Ring-1 and ring-2 represent the intermediate rings with decreasing levels of privilege.

FIG. 1A is a diagram illustrating an embodiment of a logical operating architecture 50 of the IsoX™ architecture. The logical operating architecture 50 is an abstraction of the components of the operating system and processor. The logical operating architecture 50 includes ring-0 10, ring-1 20, ring-2 30, ring-3 40, and a processor nub loader 52. Each ring in the logical operating architecture 50 can operate in either (i) a normal execution mode or (ii) an IsoX mode. The processor nub loader 52 is an instance of a processor executive (PE) handler.

Ring-0 10 includes two portions: a normal execution Ring-0 11 and an isolated execution Ring-0 15. The normal execution Ring-0 11 includes software modules that are critical for the operating system, usually referred to as the "kernel". These software modules include a primary operating system 12 (e.g., kernel), software drivers 13, and hardware drivers 14. The isolated execution Ring-0 15 includes an operating system (OS) nub 16 and a processor nub 18 as described below. The OS nub 16 and the processor nub 18 are instances of an OS executive (OSE) and processor executive (PE), respectively. The OSE and the PE are part of executive entities that operate in a protected environment associated with the isolated area 70 and the IsoX mode. The processor nub loader 52 is a bootstrap loader code that is responsible for loading the processor nub 18 from the processor or chipset into an isolated area as explained below.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$-$42_N$ and isolated execution ring-3 includes M applets $46_1$-$46_M$ (where "N" and "M" are positive whole numbers).

One concept of the IsoX™ architecture is the creation of an isolated region in the system memory, which is protected by components of the platform (e.g., the processor and chipset). This isolated region, referred to herein as an "isolated area," may also be in cache memory that is protected by a translation look aside (TLB) access check. Access to this isolated area is permitted only from a front side bus (FSB) of the processor, using special bus cycles (referred to as "isolated read and write cycles") issued by the processor executing in IsoX mode.

The IsoX mode is initialized using a privileged instruction in the processor, combined with the processor nub loader 52. The processor nub loader 52 verifies and loads a ring-0 nub software module (e.g., processor nub 18) into the isolated area. For security purposes, the processor nub loader 52 is non-modifiable, tamper-resistant and non-substitutable. In one embodiment, the processor nub loader 52 is implemented in read only memory (ROM).

One task of the processor nub 18 is to verify and load the ring-0 OS nub 16 into the isolated area. The OS nub 16 provides links to services in the primary operating system 12 (e.g., the unprotected segments of the operating system), provides page management within the isolated area, and has the responsibility for loading ring-3 application modules 45, including applets $46_1$ to $46_M$, into protected pages allocated in the isolated area. The OS nub 16 may also support paging of data between the isolated area and ordinary (e.g., non-isolated) memory. If so, then the OS nub 16 is also responsible for the integrity and confidentiality of the isolated area pages before evicting the page to the ordinary memory, and for checking the page contents upon restoration of the page.

Referring now to FIG. 1B, a diagram of the illustrative elements associated with the operating system 10 and the processor for one embodiment of the invention is shown. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to components of the operating system and processor operating in the IsoX mode. The non-isolated area 80 is accessible to all elements of the ring-0 operating system and processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_M$, can access only to the application pages 82 and the applet pages 72. The applets $46_1$ to $46_M$ reside in the isolated area 70.

Figure 1C:
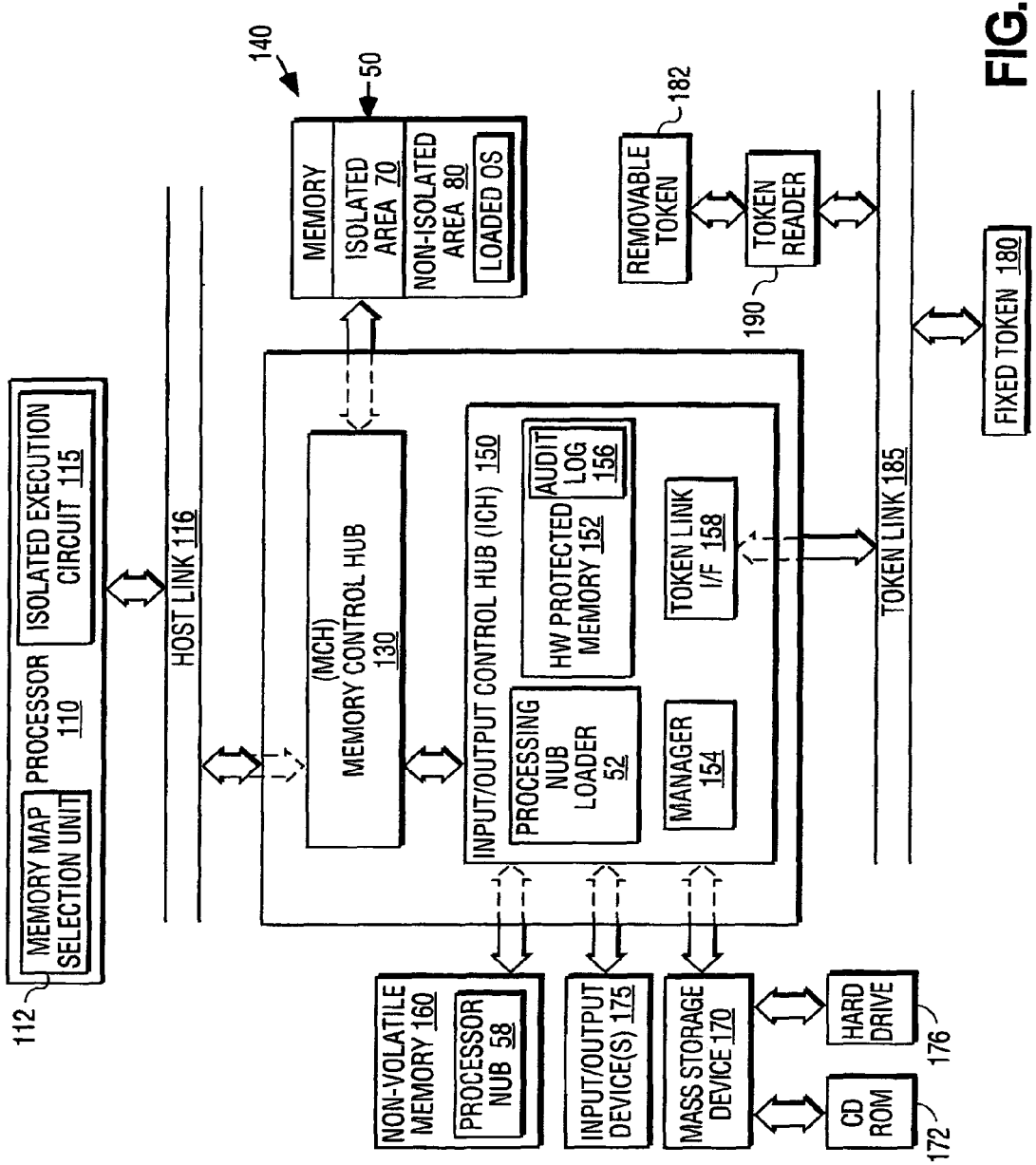
FIG. 1C is a first block diagram of an illustrative embodiment of a platform utilizing the present invention.

Referring to FIG. 1C, a block diagram of an illustrative embodiment of a platform utilizing the present invention is shown. In this embodiment, platform 100 comprises a processor 110, a chipset 120, a system memory 140 and peripheral components (e.g., tokens 180/182 coupled to a token link 185 and/or a token reader 190) in communication with each other. It is further contemplated that the platform 100 may contain optional components such as a non-volatile memory (e.g., flash) 160 and additional peripheral components. Examples of these additional peripheral components include, but are not limited or restricted to a mass storage device 170 and one or more input/output (I/O) devices 175. For clarity, the specific links for these peripheral components (e.g., a Peripheral Component Interconnect (PCI) bus, an accelerated graphics port (AGP) bus, an Industry Standard Architecture (ISA) bus, a Universal Serial Bus (USB) bus, wireless transmitter/receiver combinations, etc.) are not shown.

In general, the processor 110 represents a central processing unit of any type of architecture, such as complex instruction set computers (CISC), reduced instruction set computers (RISC), very long instruction word (VLIW), or hybrid architecture. In one embodiment, the processor 110 includes multiple logical processors. A "logical processor," sometimes referred to as a thread, is a functional unit within a physical processor having an architectural state and physical resources allocated according to a specific partitioning functionality. Thus, a multi-threaded processor includes multiple logical processors. The processor 110 is compatible with the Intel Architecture (IA) processor, such as a PENTIUM® series, the IA-32™ and IA-64™. It will be appreciated by those skilled in the art that the basic description and operation of the processor 110 applies to either a single processor platform or a multi-processor platform.

The processor 110 may operate in a normal execution mode or an IsoX mode. In particular, an isolated execution circuit 115 provides a mechanism to allow the processor 110 to operate in an IsoX mode. The isolated execution circuit 115 provides hardware and software support for the IsoX mode. This support includes configuration for isolated execution, definition of the isolated area, definition (e.g., decoding and execution) of isolated instructions, generation of isolated access bus cycles, and generation of isolated mode interrupts. In one embodiment, a memory map selection unit 112 exists within the processor 110 to select dynamically between alternative memory maps that may be employed by the processor 110.

As shown in FIG. 1C, a host link 116 is a front side bus that provides interface signals to allow the processor 110 to communicate with other processors or the chipset 120. In addition to normal mode, the host link 116 supports an isolated access link mode with corresponding interface signals for isolated read and write cycles when the processor 110 is configured in the IsoX mode. The isolated access link mode is asserted on memory accesses initiated while the processor 110 is in the IsoX mode if the physical address falls within the isolated area address range. The isolated access link mode is also asserted on instruction pre-fetch and cache write-back cycles if the address is within the isolated area address range. The processor 110 responds to snoop cycles to a cached address within the isolated area address range if the isolated access bus cycle is asserted.

Herein, the chipset 120 includes a memory control hub (MCH) 130 and an input/output control hub (ICH) 150 described below. The MCH 130 and the ICH 150 may be integrated into the same chip or placed in separate chips operating together.

With respect to the chipset 120, a MCH 130 provides control and configuration of memory and input/output devices such as the system memory 140 and the ICH 150. The MCH 130 provides interface circuits to recognize and service attestation cycles and/or isolated memory read and write cycles. In addition, the MCH 130 has memory range registers (e.g., base and length registers) to represent the isolated area in the system memory 140. Once configured, the MCH 130 aborts any access to the isolated area when the isolated access link mode is not asserted.

The system memory 140 stores code and data. The system memory 140 is typically implemented with dynamic random access memory (DRAM) or static random access memory (SRAM). The system memory 140 includes the accessible physical memory 60 (shown in FIG. 1B). The accessible physical memory 60 includes the isolated area 70 and the non-isolated area 80 as shown in FIG. 1B. The isolated area 70 is the memory area that is defined by the processor 110 when operating in the IsoX mode. Access to the isolated area 70 is restricted and is enforced by the processor 110 and/or the chipset 120 that integrates the isolated area functionality. The non-isolated area 80 includes a loaded operating system (OS). The loaded OS 142 is the portion of the operating system that is typically loaded from the mass storage device 170 via some boot code in a boot storage such as a boot read only memory (ROM). Of course, the system memory 140 may also include other programs or data which are not shown.

As shown in FIG. 1C, the ICH 150 supports isolated execution in addition to traditional I/O functions. In this embodiment, the ICH 150 comprises at least the processor nub loader 52 (shown in FIG. 1A), a hardware-protected memory 152, an isolated execution logical processing manager 154, and a token link interface 158. For clarity, only one ICH 150 is shown although platform 100 may be implemented with multiple ICHs. When there are multiple ICHs, a designated ICH is selected to control the isolated area configuration and status. This selection may be performed by an external strapping pin. As is known by one skilled in the art, other methods of selecting can be used.

The processor nub loader 52, as shown in FIGS. 1A and 1C, includes a processor nub loader code and its hash value (or digest). After being invoked by execution of an appropriated isolated instruction (e.g., ISO_INIT) by the processor 110, the processor nub loader 52 is transferred to the isolated area 70. Thereafter, the processor nub loader 52 copies the processor nub 18 from the non-volatile memory 160 into the isolated area 70, verifies and places a representation of the processor nub 18 (e.g., a hash value) into the protected memory 152. Herein, the protected memory 152 is implemented as a memory array with single write, multiple read capability. This non-modifiable capability is controlled by logic or is part of the inherent nature of the memory itself. For example, as shown, the protected memory 152 may include a plurality of single write, multiple read registers.

As shown in FIG. 1C, the protected memory 152 is configured to support an audit log 156. An "audit log" 156 is information concerning the operating environment of the platform 100; namely, a listing of data that represents what information has been successfully loaded into the system memory 140 after power-on of the platform 100. For example, the representative data may be hash values of each software module loaded into the system memory 140. These software modules may include the processor nub 18, the OS nub 16, and/or any other critical software modules (e.g., ring-0 modules) loaded into the isolated area 70. Thus, the audit log 156 can act as a fingerprint that identifies information loaded into the platform (e.g., the ring-0 code controlling the isolated execution configuration and operation), and is used to attest or prove the state of the current isolated execution.

In another embodiment, both the protected memory 152 and unprotected memory (e.g., a memory array in the non-isolated area 80 of the system memory 140 of FIG. 1C) may collectively provide a protected audit log 156. The audit log 156 and information concerning the state of the audit log 156 (e.g., a total hash value for the representative data within the audit log 156) are stored in the protected memory 152.

Referring still to FIG. 1C, the non-volatile memory 160 stores non-volatile information. Typically, the non-volatile memory 160 is implemented in flash memory. The non-volatile memory 160 includes the processor nub 18 as described above. Additionally, the processor nub 18 may also provide application programming interface (API) abstractions to low-level security services provided by other hardware and may be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$-$42_N$), applets (e.g., applets $46_1$ to $46_M$) and operating systems. The mass storage device 170 may include a compact disk (CD) ROM 172, a hard drive 176, or any other magnetic or optic storage devices. The mass storage device 170 also provides a mechanism to read platform-readable media. When implemented in software, the elements of the present invention are stored in a processor readable medium. The "processor readable medium" may include any medium that can store or transfer information. Examples of the processor readable medium include an electronic circuit, a semiconductor memory device, a read only memory (ROM), a flash memory, an erasable programmable ROM (EPROM), a fiber optic medium, a radio frequency (RF) link, and any platform readable media such as a floppy diskette, a CD-ROM, an optical disk, a hard disk, etc.

In communication with the platform 100, I/O devices 175 include stationary or portable user input devices, each of which performs one or more I/O functions. Examples of a stationary user input device include a keyboard, a keypad, a mouse, a trackball, a touch pad, and a stylus. Examples of a portable user input device include a handset, beeper, handheld (e.g., personal digital assistant) or any wireless device.

Figure 2:
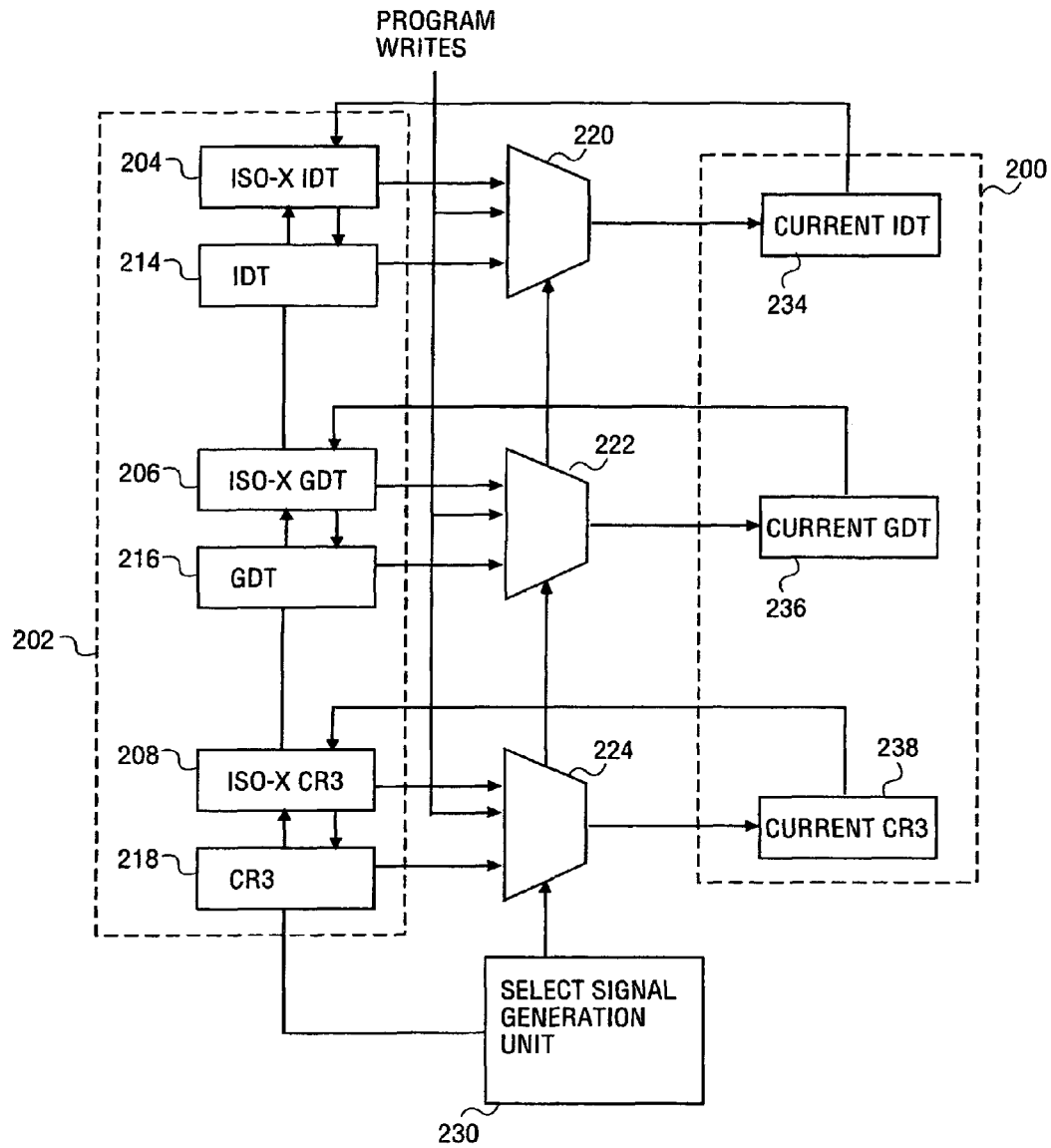
FIG. 2 is a block diagram of a memory map selection unit of one embodiment of the invention.

FIG. 2 is a block diagram of a memory map selection unit of one embodiment of the invention. A set of current control registers 200 defines the memory map currently employed by the processor. This set of control registers includes a current interrupt descriptor table (IDT) register 234, a current global descriptor table (GDT) register 236, and a page table map base address register 238 (also referred to herein as control register 3, abbreviated CR3). By changing the values in these current control registers 200, the memory map used by the processor is changed. Thus, for example, by changing current CR3 238, a different page table map comes into use.

A set of control registers 202 from which the current control registers 200 may be loaded are also retained with the processor. The set of control registers 202 includes two subsets, an IsoX subset, and a normal subset, including IsoX IDT 204, IsoX GDT 206 and IsoX CR3 208 and IDT 218, GDT 216 and CR3 218, respectively. A plurality of selection units, such as multiplexers 220, 222, 224, are used to select between the first and second subset of the set of control registers 202. The selection signal is provided by selection signal generation unit 230, which employs the IsoX mode bit in conjunction with an event vector to generate the selection signal to the multiplexers 220, 222 and 224. In one embodiment, the events to be handled in IsoX mode are stored in a lookup table (LUT), and the event vector is used as an index to the LUT to identify if the event should be handled in an IsoX mode. By appropriately populating the LUT the OS nub can ensure that any event (whether synchronous or asynchronous) is handled in isolated execution mode if desired. It is also within the scope and contemplation of the invention for the OS nub to dynamically modify the LUT from time to time.

In this manner, the current memory map corresponding to IDT 234, GDT 216, and CR3 238, can be dynamically changed responsive to the receipt of an event. Accordingly, it is possible to ensure that an asynchronous event, such as a machine check, which might otherwise cause a data leakage, is always handled in isolated mode using an appropriate memory map. Thus, on receipt of a machine check, selection signal generation unit 230 asserts a selection signal to select control registers 204, 206 and 208 to have their contents loaded into current IDT register 234, current GDT register 236 and current CR3 register 238, respectively. The exception vector may then be dispatched and will be handled using the IsoX memory map. Other types of events such as non-maskable interrupts (NMI) or clock interrupts may be, at the discretion of the OS nub handled in isolated execution mode, even where data leakage is not a concern. For example, in the context of the clock interrupt requiring that it be handled by the isolated environment avoids denial of service conditions in the OS nub.

The IsoX mode bit is also used to control writes to the first subset of control registers in control register set 202. By requiring isolated execution mode for any changes to the IsoX subset 204, 206 and 208, software attack by corrupting the memory mapping for asynchronous event handling is prevented.

Figure 3:
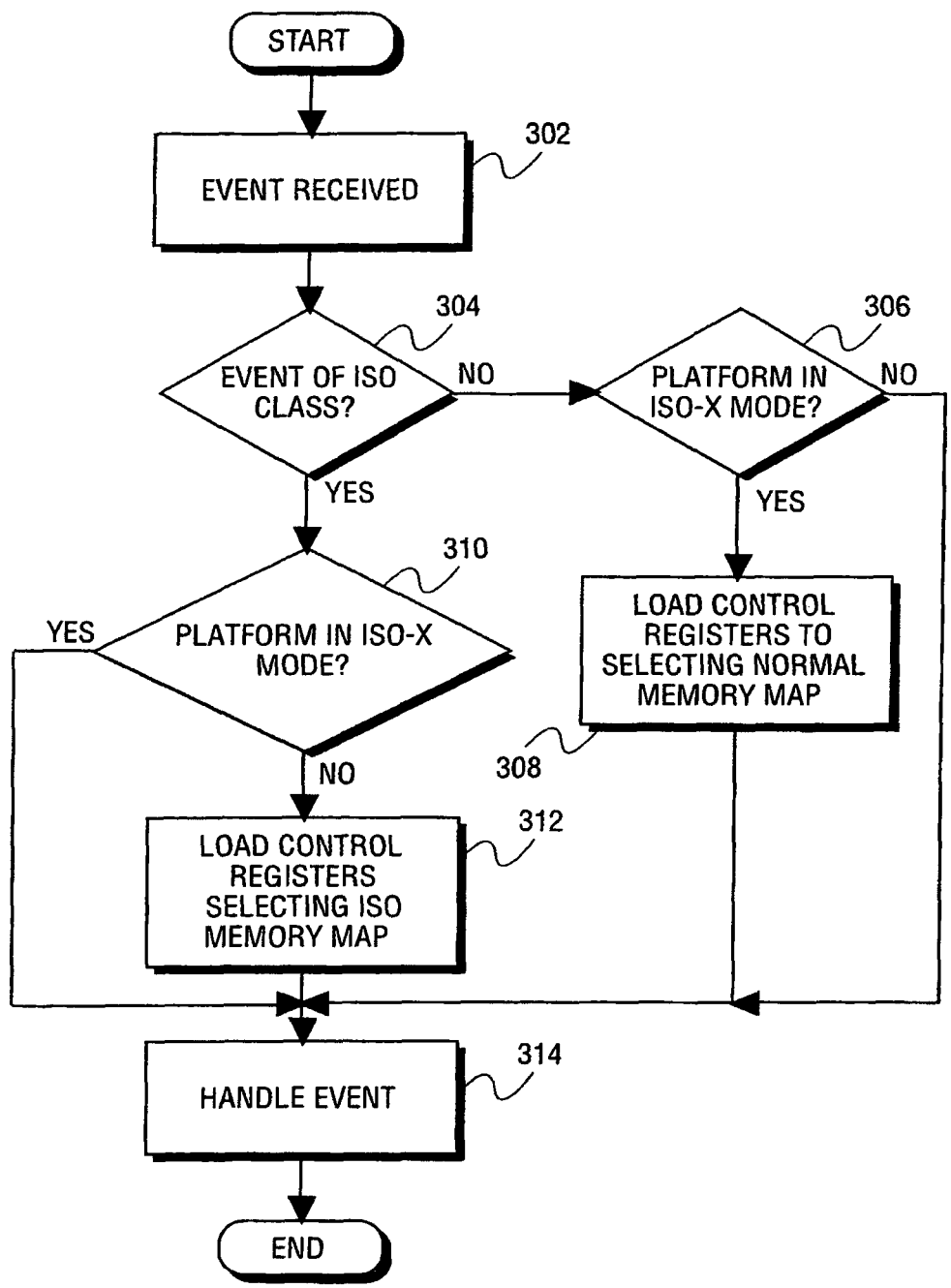
FIG. 3 is a flow diagram of operation response to an asynchronous event in one embodiment of the invention.

FIG. 3 is a flow diagram of operation response to an asynchronous event in one embodiment of the invention. At function block 302, an asynchronous event is received. A determination is made at functional block 304 if the event is of a class to be handled in IsoX mode. This determination may be implicit, such as by applying the vector to a logic block or explicit such as where the vector is used to index into a LUT. If the event is not of the class, a determination is made at decision block 306 if the platform is currently in IsoX mode. If it is, the memory map selection unit is activated to reload the current control registers selecting the normal memory map at functional block 308.

If at decision block 304 the event is of a class to be handled in an IsoX mode, a determination is made at decision 310 whether the platform is in IsoX mode. If it is not in IsoX mode, the selection signal generation unit causes the memory map selection unit to load the current control registers with the IsoX memory map at functional block 312. After the appropriate memory map is loaded, or is determined to already be loaded, the vector is dispatched and the asynchronous event is handled at function block 314.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
memory;
non-volatile memory;
a cache memory;
a processor coupled with the cache memory, the processor comprising:
logic to cause the processor to enter a first mode by transferring a nub loader into an isolated area of the memory, copying a processor nub from the non-volatile memory to the isolated area of the memory, and verifying and placing a representation of the processor nub into hardware protected memory, in response to a first instruction, wherein the first mode is to be indicated by a first mode bit, and wherein the first mode corresponds to a different security level than a normal mode of the processor, and wherein in the first mode a first program is to control access to a secure portion of the cache memory using a translation look-aside buffer;
a flash interface to communicate with a flash memory;
a universal serial bus (USB) interface to communicate with a USB device; and
a boot read only memory (ROM) to store a boot code.

2. The apparatus of claim 1, wherein in the first mode the first program is further to restrict access to a special-purpose control register.

3. The apparatus of claim 2, wherein the special-purpose control register is a virtual memory management descriptor.

4. The apparatus of claim 2, wherein the special-purpose control register is an interrupt vector table descriptor.

* * * * *